United States Patent [19]

Toda

[11] Patent Number: 5,448,974
[45] Date of Patent: Sep. 12, 1995

[54] ENGINE OUTPUT CONTROL

[75] Inventor: Atsushi Toda, Iwata, Japan

[73] Assignee: Yamaha Hatsudoki Kabushiki Kaisha, Iwata, Japan

[21] Appl. No.: 200,417

[22] Filed: Feb. 23, 1994

[30] Foreign Application Priority Data

Feb. 25, 1993 [JP] Japan .................................. 5-036703

[51] Int. Cl.⁶ ...................... F02D 29/00; F02D 35/00
[52] U.S. Cl. .................... 123/400; 74/471 R; 123/413; 123/478; 123/571; 123/586
[58] Field of Search ............... 123/400, 413, 478, 568, 123/571, 586; 74/470, 471 R, 513

[56] References Cited

U.S. PATENT DOCUMENTS

| | | | |
|---|---|---|---|
| 3,373,725 | 3/1968 | Arpaia | 123/568 X |
| 3,465,736 | 9/1969 | Daigh et al. | 123/568 |
| 3,612,020 | 10/1971 | Moulds | 123/568 |
| 3,734,069 | 5/1973 | Akiyama et al. | 123/413 X |
| 4,517,941 | 5/1985 | Nakagawa | 123/586 X |
| 4,788,955 | 12/1988 | Wood | 123/413 |
| 5,065,723 | 11/1991 | Broughton et al. | 123/413 |

Primary Examiner—Tony M. Argenbright
Attorney, Agent, or Firm—Knobbe, Martens, Olson & Bear

[57] ABSTRACT

An engine output control system incorporating two separate members that control engine output such as a throttle valve and fuel injection control, EGR control, secondary air control and/or spark advance control. A mechanism is provided for operating these members so that one of the speed control members (the throttle valve) is moved to its fully opened position before the operator controlled member is fully opened. Further power outputs are achieved by moving the other engine output controlling member to its extreme position so as to permit operation of lean burn at intermediate ranges without sacrificing maximum engine power output.

25 Claims, 8 Drawing Sheets

ENGINE OUTPUT CONTROL

BACKGROUND OF THE INVENTION

This invention relates to an engine output control and more particularly to an improved method and apparatus for controlling the output of an internal combustion engine to improve performance at partial loads.

A various number of types of arrangements are provided for controlling the output of an internal combustion engine. The term "output" is employed so as to indicate either the speed or torque which the engine develops. This can be done in a variety of fashions. For example, with spark ignited engines the output is controlled at least in part by a throttle valve that is positioned in the induction system of the engine. With a diesel engine, on the other hand, the output may be controlled by changing the timing and/or amount of fuel injection or fuel supplied to the engine.

In addition to these basic controls, other aspects of the engine which can also affect its output may be changed along with the basic output control. For example, with spark ignited engines the output may be also changed by changing the spark timing, fuel supply amount and timing, amount of exhaust gas recirculation and other factors. Generally these controls are operated by a linkage system from the operator controlled member and are done in some form of sequencing. However, the main control is moved between its closed or idle position and its wide open maximum output position in response to like movement of the operator controlled member. It has been found, however, that these systems can preclude the obtaining of optimum performance, particular at partial loads.

It is, therefore, a principal object of this invention to provide an improved engine output control.

It is a further object of this invention to provide an improved method and apparatus for controlling the output of an engine so as to improve performance at partial loads in the way of both fuel consumption and exhaust emission control.

SUMMARY OF THE INVENTION

This invention is adapted to be embodied in an engine control system comprised of an operator controlled control member movable between a first extreme position through a plurality of intermediate positions to a second extreme position. A first engine output controlling member is moveable between a first and a second extreme position between a plurality of intermediate positions for varying the output of the engine. A second engine output controlling member is also moveable between first and second extreme positions through a plurality of intermediate positions for varying the output of the engine. Means operatively connect the operator controlled control member to the first and second engine output controlling members for movement of the first member between its extreme position in response to movement of the operator controlled control member from its first extreme position to an intermediate position and for moving the second engine output controlling member to its second extreme position upon movement of the operator controlled control member to its second extreme position.

DETAILED DESCRIPTION OF THE PREFERRED EMBODIMENTS OF THE INVENTION

Figure 1:
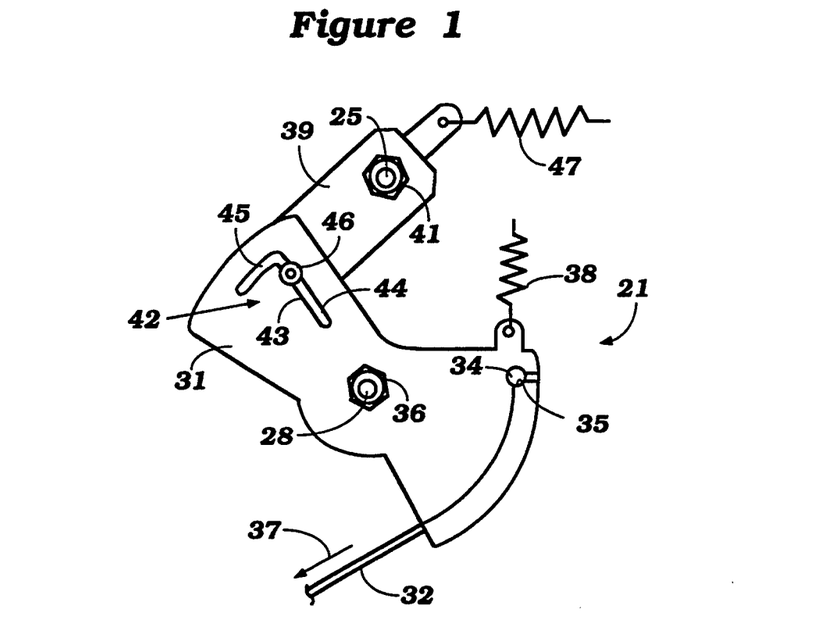
FIG. 1 is a side elevational view of a portion of an engine output control system constructed in accordance with a first embodiment of the invention and showing the mechanism in a first extreme position.
Figure 2:
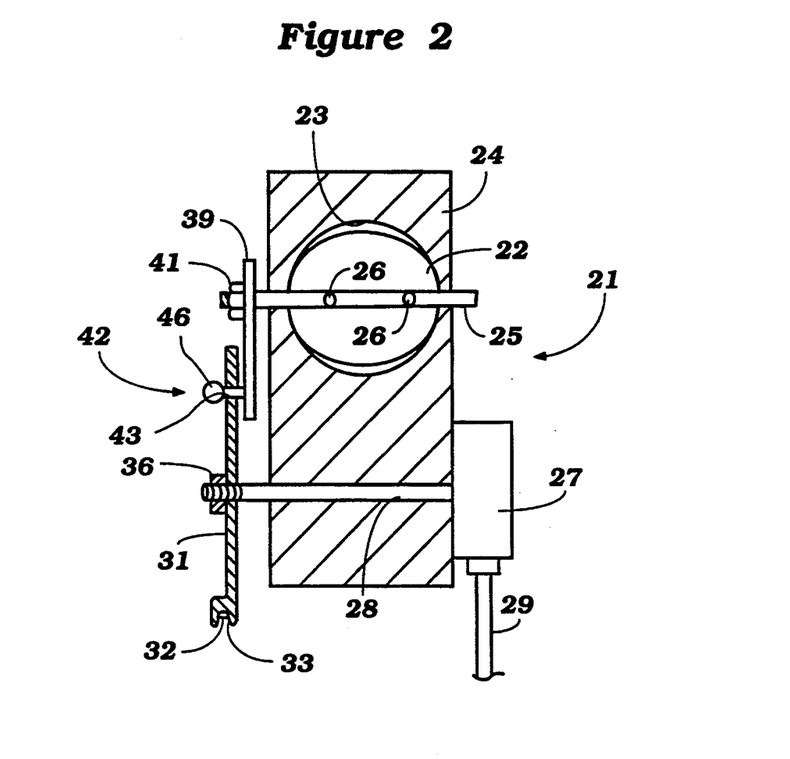
FIG. 2 is a cross-sectional view taken along a plane extending generally perpendicularly to the plane FIG. 1.
Figure 3:
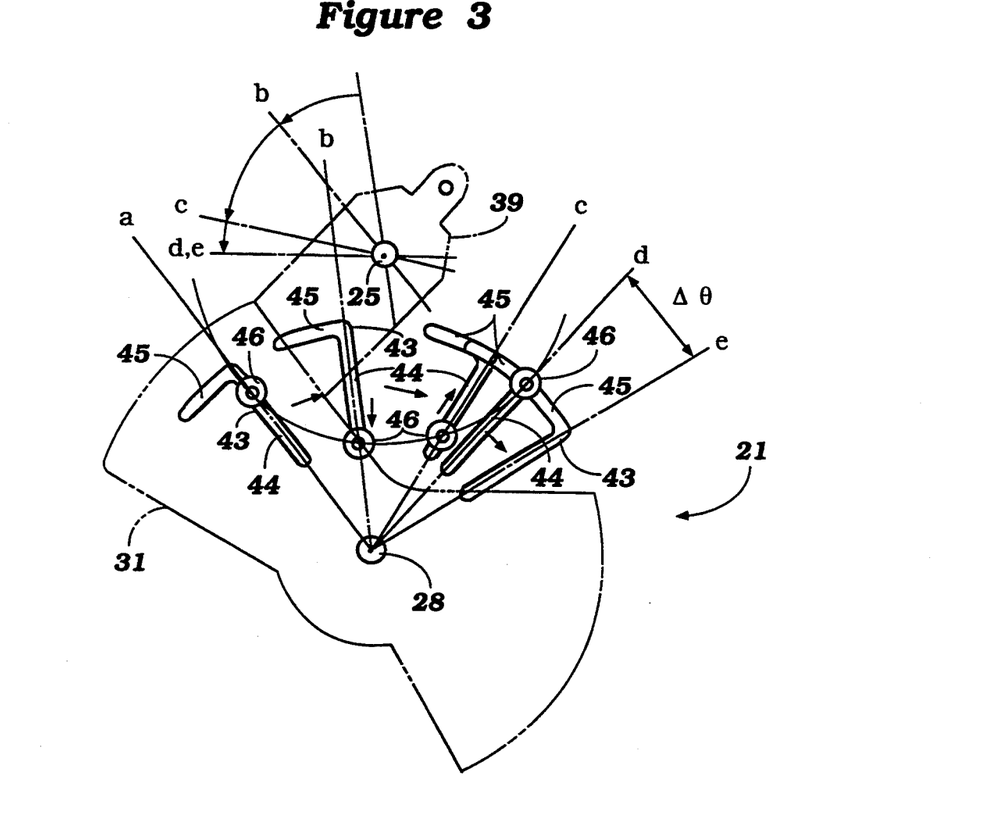
FIG. 3 is an enlarged view, in part similar to Figure 1, and shows the position of the members throughout their respective ranges of movement.

Referring now in detail to the drawings and initially to FIGS. 1-3, an engine output control mechanism constructed in accordance with an embodiment of the invention is identified generally by the reference numeral 21. This engine output control mechanism 21 is associated with an internal combustion engine which may be of any known type. The invention deals primarily with the manner and structure for controlling the output of the engine rather than the basic engine structure per se. Therefore, a detailed description of the details of the associated engine is not believed to be necessary to understand the invention. However, it will be apparent to those skilled in the art from the following description how the invention can be applied to engines of any known type.

The engine output control 21 has a pair of engine output controlling members the first of which comprises a throttle valve 22 that is rotatably positioned in an induction passage 23 formed by a manifold 24 or other member associated with the engine. The throttle valve 22 is of the butterfly type and is affixed to a throttle valve shaft 25 by means of a pair of set screws 26 in a well known manner. As is well known in engine construction, the position of the throttle valve 22 will determine the output of the engine by controlling the amount of air which can flow to the engine.

Another engine output controlling member, indicated generally by the reference numeral 27 is also carried by the body 24 and in this embodiment the member 27 can be a potentiometer or other type of device that senses the position of a shaft 28 journalled in the body 24 and supplies a control signal through conductors 29 to an ECU or other type of engine control for controlling the output of the engine. This control may be the fuel injection system for the engine wherein the signal from the potentiometer 27 controls, in accordance with any desired control routine, the duration and timing of fuel injection. Other type of controls which may be employed to practice the invention will be described later.

The mechanism 21 is controlled by an operator controlled control member, in this case a control lever 31. The control lever 31 is actually operated by a remotely located operator by means of a control wire 32 that is received in a groove 33 formed in the lever 31 and which is held in place by means of a fastener 34 that is received in an opening 35 formed at the end of the slot 33 in a manner well known in this art.

The control lever 31 is affixed directly for rotation with the shaft 28 by means of a nut 36.

As should be readily apparent, a force on the control wire 32 in the direction of the arrow 37 (FIG. 1) will cause a rotation of the control lever 31 from a first extreme position shown in FIGS. 1 and 2 and identified by the line "a" in FIG. 3 to a second extreme position, indicated by the line "e" in FIG. 3 and which constitutes the full output position. A tension spring 38 is connected between the control lever 31 and the body 24 so as to urge the control lever 31 to its first extreme position.

A throttle control lever 39 is affixed to the throttle valve shaft 25 by means of a threaded fastener 41. This throttle control lever 39 is operated by means of a motion transmitting mechanism, indicated generally by the reference numeral 42 from the control lever 31 so as to permit the throttle valve 22 to be moved between its closed or idle position, as previously noted and its fully opened position upon response to movement of the control lever 31 from its first extreme position to an intermediate position "d" at which time the throttle valve 22 will be moved to its fully opened, second extreme position. This motion transmitting mechanism 42 further includes a lost motion device so that the control lever 31 can continue to rotate to its second extreme position "e" without continued movement of the throttle control lever 39 or the throttle valve 22. Said another way, the throttle valve 22 is held in its fully opened second extreme position while the control lever 31 moves from the intermediate position "d" to its fully opened position "e".

This motion transmitting mechanism, 42 comprise an L-shaped slot 43 formed in the control lever 31 which has a first generally radially extending portion 44 and a second portion 45 that is arcuate and which has a center of curvature coincident with the axis of rotation of the shaft 28. A follower pin 46 is affixed to the throttle control lever 39 and is slidably received in the slot 43 for permitting the aforenoted motion transmission. A coil compression spring 47 is interconnected between the throttle control lever 39 and a fixed body on the engine for urging the throttle control lever to its idle or first extreme position.

Figure 4:
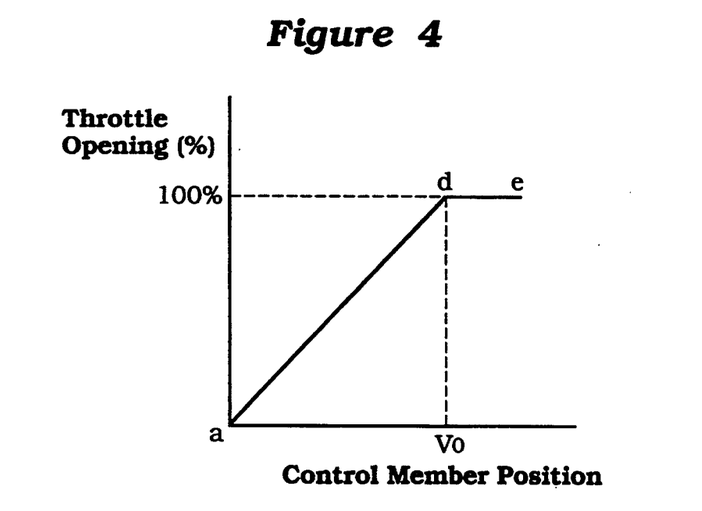
FIG. 4 is a graphical view showing the percent of throttle valve opening in relation to the control member position.

FIG. 4 shows the relative movements of the throttle valve 22 and the control lever 31 throughout the entire range of movement while FIG. 3 is a multi-position view also showing the relative movement. As may be seen in FIG. 3, the throttle control lever 39 rotates about an axis coincident with the center of the throttle valve shaft 25 while the control lever 31 rotates about an axis defined by the axis of rotation of the shaft 28. In the first extreme position of both the control lever 31 and the throttle valve 22, a, the zero position exists as shown in FIG. 4. During the range of movement from "a" to "d" the pin 46 traverses the slot portion 44 first moving downwardly as the throttle valve 22 is opened and then back upwardly from the position shown at b to the position shown at d when the throttle valve 22 continues to open to its fully opened position $V_o$. At this time, the pin 46 will enter the slot 45 and continued rotation of the control lever 31 will cause no rotation of the throttle control lever 39 and the throttle control lever 39 will be held in its fully opened position as shown in FIG. 4.

Upon reverse movement, the spring 39 cannot effect closure of the throttle valve 22 until the position "d" is reached and then after this point in time the throttle valve 22 will be closed as the control lever 31 closes. This provides a lost motion degree of movement $\Delta\theta$ as shown in FIG. 3 and this lost motion phase is used to effect an increase or change in engine output without a change in position of the throttle valve 22. By doing this, it is possible to improve mid-range engine performance and specifically improve fuel consumption and exhaust emission control at partial loads.

Figure 5:
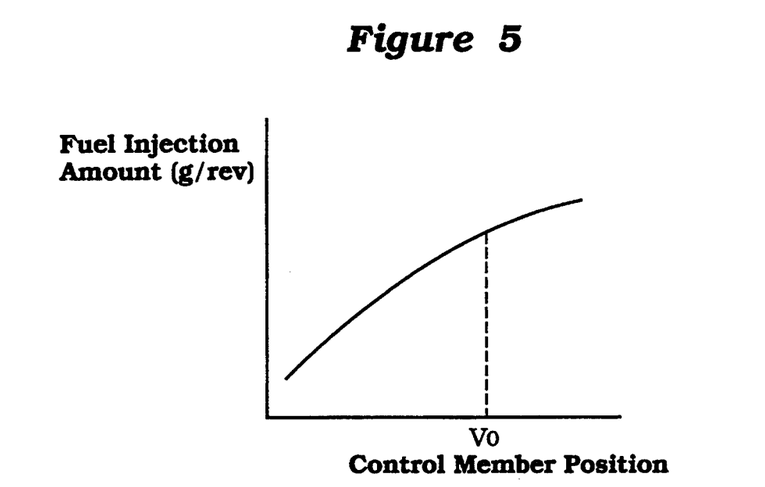
FIG. 5 is a graphical view showing the amount of fuel injected versus control member position in accordance with an embodiment of the invention.
Figure 6:
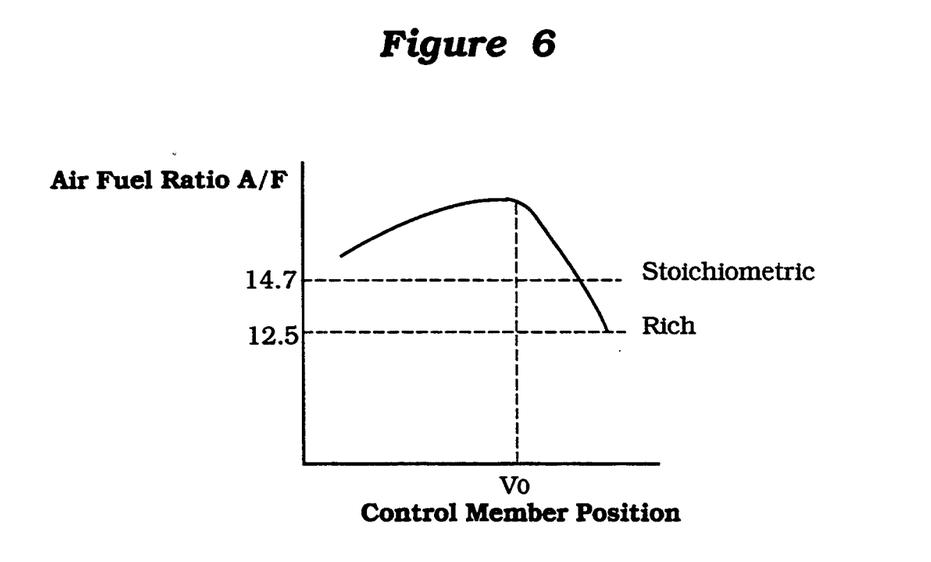
FIG. 6 is a graphical view showing the air/fuel ratio in response to control member position in this embodiment.

FIGS. 5 and 6 show one method where this can be accomplished wherein the potentiometer 27 controls the amount of fuel supplied by a fuel injection system. The specific fuel injection control can be of any known type such as varying the duration and timing of fuel injection. FIG. 5 is a graphical view showing the relationship of fuel injection amount in grams of fuel per revolution relative to position of the control lever 31 while FIG. 6 shows the air/fuel ratio in response to the position of the control lever 31. As may be seen, when the throttle valve is open from its first extreme position (idle "a") towards its second extreme, fully open position "d", the fuel injection amount increases along a curve. This curve is chosen so that the air fuel ratio as shown in FIG. 6 is less than stoichiometric and in a lean burn condition so as to improve fuel economy and fuel emission control. However, when the throttle valve is in its fully opened position, air flow will not substantially increase but fuel injection amount is continued to increase along the curve of FIG. 5. This causes the air/fuel ratio to move toward stoichiometric (14.7) and toward a rich mixture (12.5) at full throttle so as to improve the engine output without deteriorating performance at the mid-range.

Figure 7:
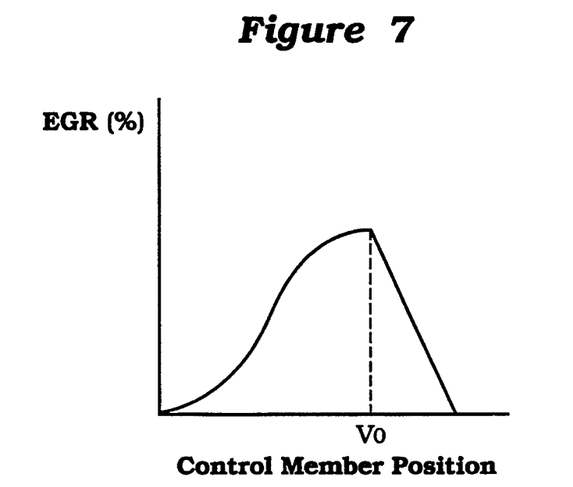
FIG. 7 is a graphical view showing the amount of exhaust gas recirculation in response to control member position in accordance with another embodiment of the invention.

FIG. 7 is a embodiment of another way in which the engine output can be changed by holding the throttle valve 22 in its fully opened position upon continued opening of the control lever 31. In this embodiment, the amount of exhaust gas recirculation is decreased under this condition to improve power output while still allowing lean burn operation at other engine conditions. The amount of EGR recirculated can be controlled by a known control method and it will be seen that the amount of EGR is increased along the curve as the control member 31 opens until the position Vo (which corresponds to the position "d" in FIG. 3) when the throttle valve 22 is fully opened. Upon further opening of the control lever 31 the torque and/or speed of the engine is increased by decreasing the amount of exhaust gas recirculated so as to decrease the air/fuel ratio somewhat along a curve as shown in FIG. 6.

Figure 8:
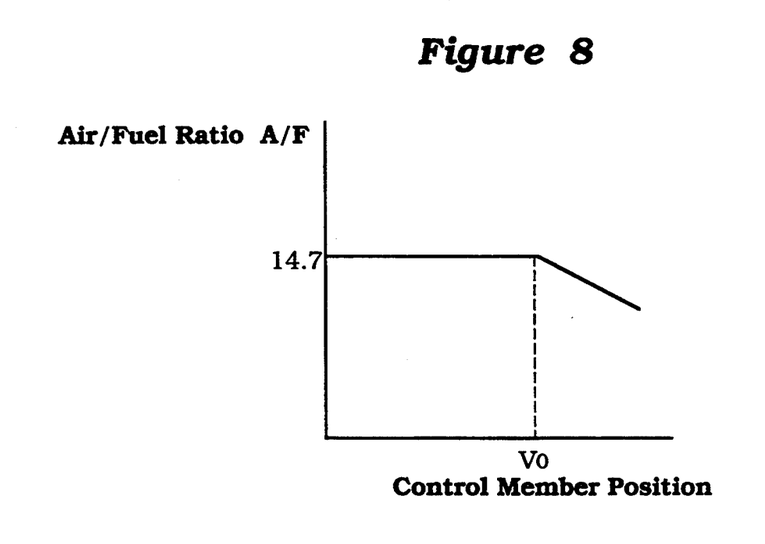
FIG. 8 is a graphical view showing the air/fuel ratio in response to control member position in accordance with another embodiment of the invention.
Figure 9:
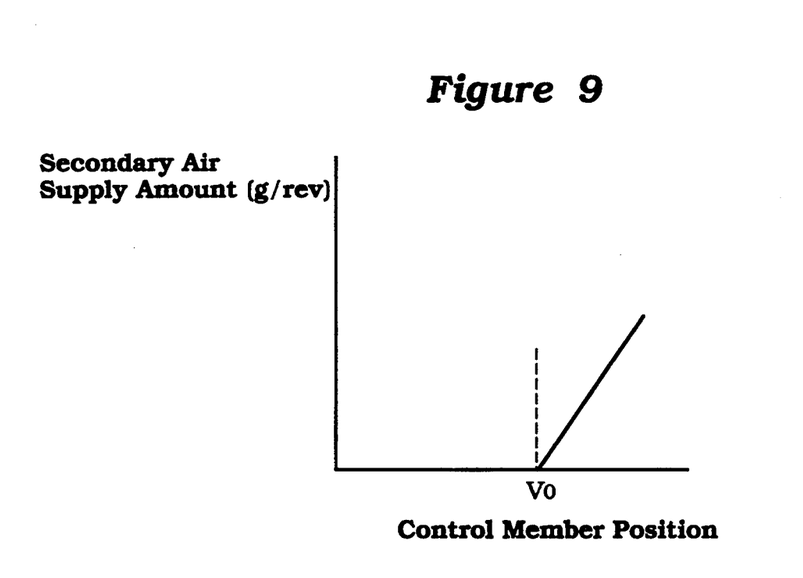
FIG. 9 is a graphical view showing the amount of secondary air supplied to the exhaust manifold relative to control member position in accordance with the embodiment of FIG. 8.

This concept may also be used in conjunction with a 3-way catalyst system by increasing the amount of secondary air supplied to the manifold when the throttle valve is fully opened and the control lever 31 is moved past the position $V_o$. As may be seen in FIG. 8, this decreases the air/fuel ratio from stoichiometric and this is done simultaneously with the addition of air to the manifold so as to maintain exhaust emission control and increase the power of the engine without further opening of the throttle valve.

Figure 10:
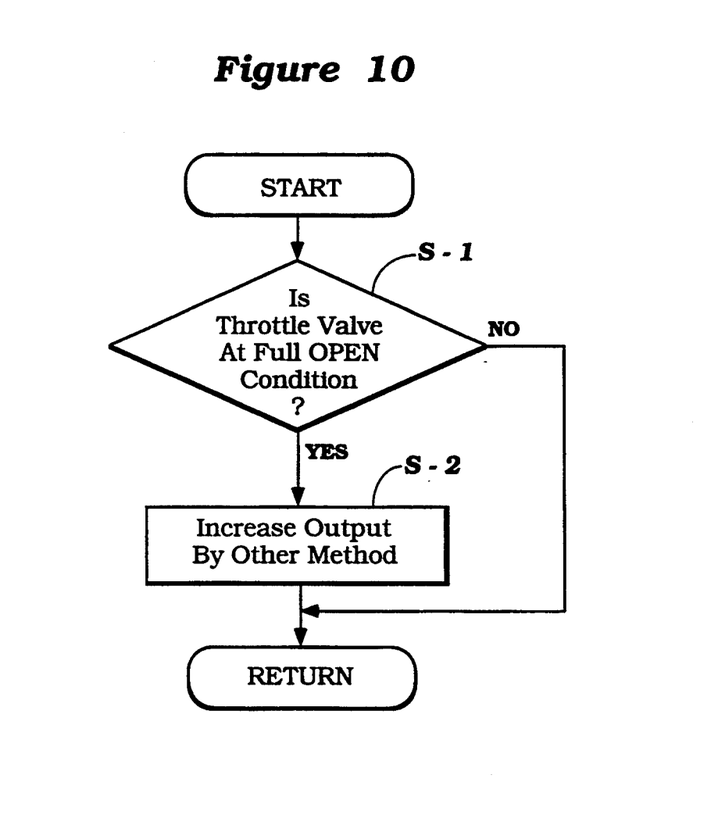
FIG. 10 is a block diagram showing the control routine practiced with all embodiments.

FIG. 10 shows in block diagram form how the control routine operates. When the program starts at the step 1 it determines if the throttle valve 22 is in its fully opened position. If not, the supplemental method for increasing engine output is not employed and the program returns. If, however, at the step 1 it is determined that the throttle valve is fully opened then the program moves to the step 2 so as to increase the engine output by the alterative arrangement. This can be done by providing additional fuel, changing spark timing, decreasing EGR amount and/or adding supplemental air to the manifold and/or enriching the fuel air mixture. Of course, combinations of these methods may be used.

Figure 11:
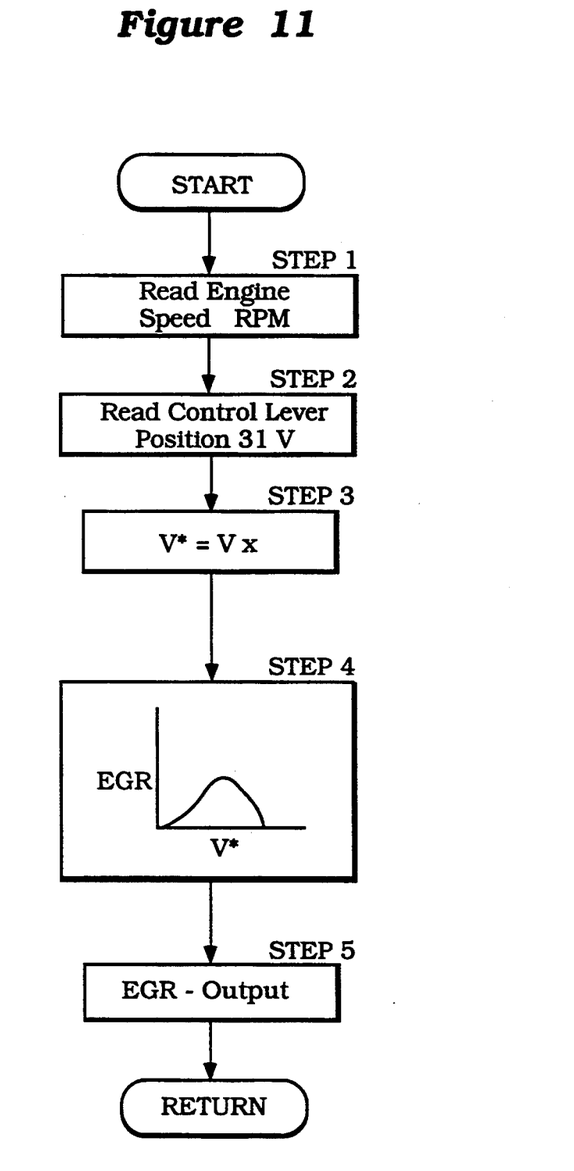
FIG. 11 is a block diagram showing the control routine in accordance with an embodiment of the invention employing EGR control.

FIG. 11 shows a type of control routine that can be employed for controlling the amount of EGR in accordance with a curve such as shown in FIG. 7. In accordance with this routine, the program begins and moves to the step 1 so as to read the engine speed. The program then moves to the step 2 so as to read the control lever position of the control lever 31 which position is the output of the sensor 27 (V). The program then moves to the step 3 so as to set a correction factor dependent upon the control valve lever position V and engine speed from an appropriate memory using a constant $\alpha$ alpha. This determines the value of $V^*$.

The program then moves to the step 4 so as to read from a map the amount of EGR for the corrected position of the control lever. This then determines the appropriate EGR amount and the program then moves to the step 5 so as to output the appropriate control signal to the EGR valve so as to set the necessary amount of EGR so as to achieve the desired engine output.

Figure 12:
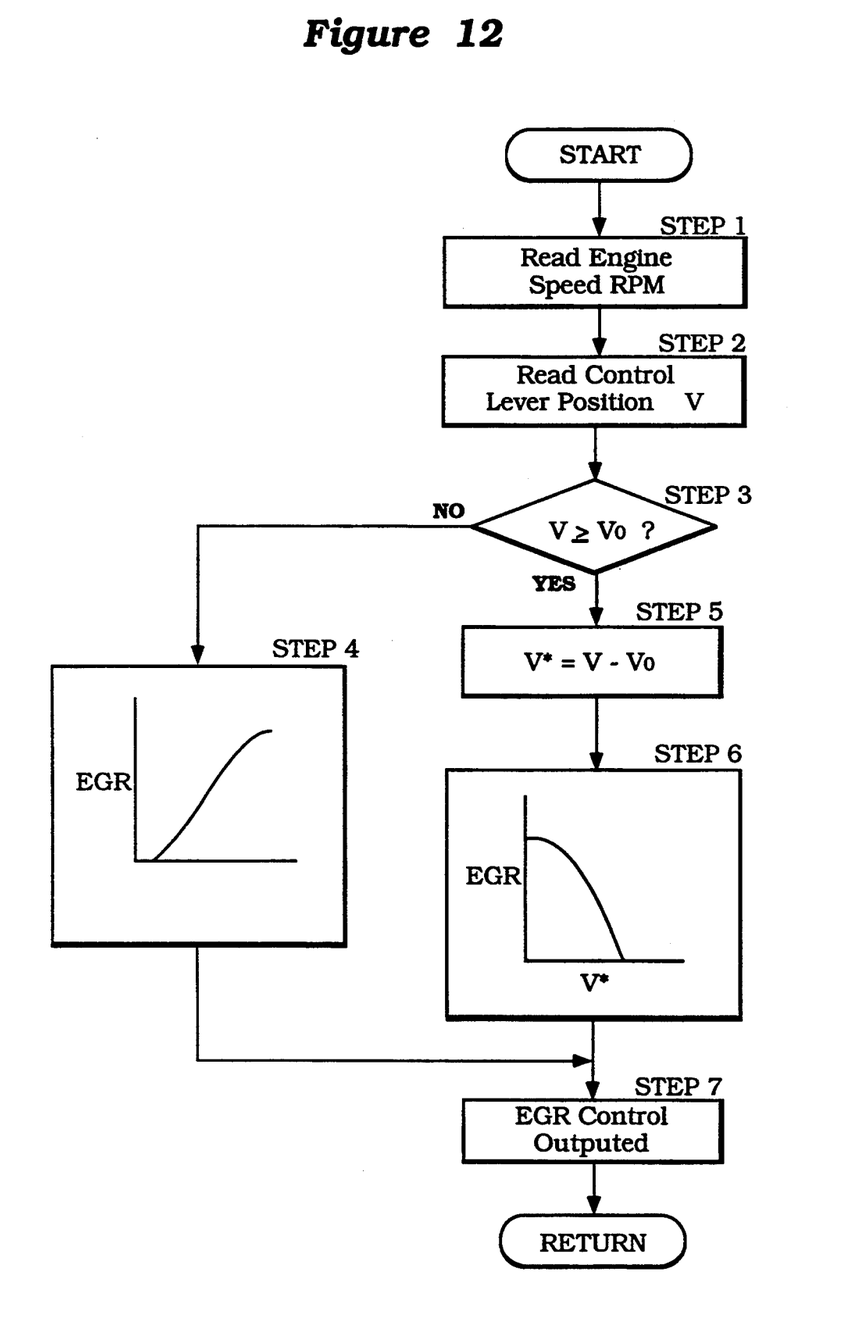
FIG. 12 is a block diagram of another form of control routine.

FIG. 12 shows another method of setting the EGR value which will be determined when the control lever 31 is positioned in a position so that the throttle valve 22 is in its fully opened position. This method again follows the same steps 1 and 2 of the previously control routine so as to read engine speed at the step 1 and read the control lever position V of the control lever 31 at step 2.

The program then deviates from the method of FIG. 11 so as to determine at the step 3 if the control lever 31 is at a position V which is greater than or equal to the $V_o$ position. This will also determine if the throttle valve 22 is fully opened and if it is fully opened or less the program moves to the step 4 so as to read the EGR amount required from this map.

If, at the step 3, it is determined that the control lever 31 is opened to an amount greater than the amount $V_o$, then the program moves to the step 5 so as to determine the amount of additional opening $V^*$. The program then moves to the step 6 so as to read the EGR amount required in accordance with the map of this curve.

Once the step 4 of step 6 are completed, the program moves to the step 7 so as to output the EGR control signal to set the appropriate amount of EGR and the program then repeats.

Figure 13:
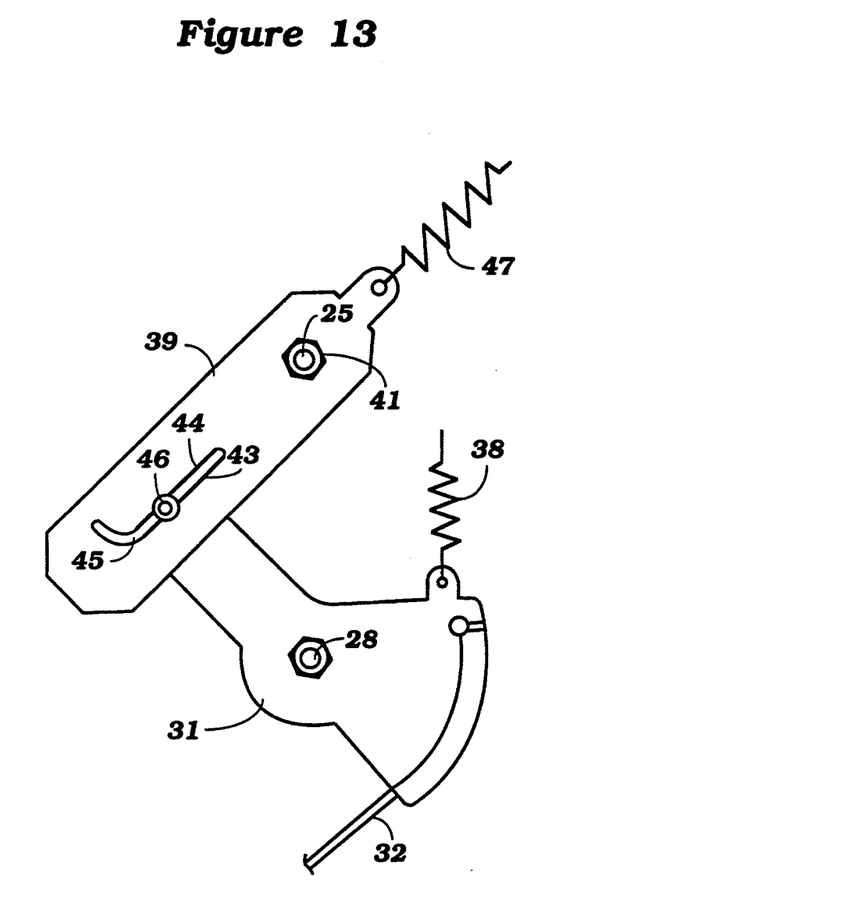
FIG. 13 is a side elevational view, in part similar to FIG. 1, and shows another embodiment of mechanism for achieving this result.

The embodiments thus far described have all employed a lost motion type of motion transmitting mechanism as shown in FIGS. 1–3. Of course, various other types of motion transmitting mechanisms may be employed and FIG. 13 shows another such type. Basically this embodiment is the same as the embodiment of FIGS. 1–3, however, the cam slot and follower are reversed in this embodiment and since that is the only difference components which are the same have been identified by the same reference numerals and will be described again only insofar as is necessary to understand the construction and operation of this embodiment.

In this embodiment, a follower pin 46 is affixed to the control lever 31 and extends into a cam slot 43 formed in the throttle control lever 39. This cam slot 43 has a first straight portion 44 and a second curved portion 45 with the curved portion 45 in this embodiment being generally along a radius so that when the pin 46 traverses the slot 44, the throttle control lever 39 will be moved from its first extreme fully closed or idle position to its second extreme or fully open position. After this, the pin 46 will traverse the slot portion 45 so that the control lever 31 can continue to be open while, at the same time, no movement of the throttle lever 39 will occur.

It should be readily apparent from the foregoing description that the described embodiments of the invention permit the use of a device for controlling the engine output in the form of either speed and/or torque while achieving full throttle valve opening before maximum output. This permits lean burn operation at midrange so as to improve fuel economy and exhaust emission control without sacrificing maximum engine output. Of course, the foregoing description is that of preferred embodiments of the invention and various changes and modifications may be made without departing from the spirit and scope of the invention, as defined by the appended claims.

I claim:

1. An engine control system comprising an operator controlled control element moveable between a first extreme position through a plurality of intermediate positions to a second extreme position, a first engine output controlling member moveable between first and second extreme positions through a plurality of intermediate positions for varying the output of said engine, a second engine output controlling number moveable between first and second extreme positions through a plurality of intermediate positions for varying the output of said engine, and means for operatively connecting said operator controlled control member to said first and said second engine output controlling members for movement of said first controlling member between its extreme positions in response to movement of said operator controlled control member from its first extreme position to an intermediate position and for moving said second engine output control member to its second extreme position upon movement of said operator controlled control member to its second extreme position.

2. An engine control system as set forth in claim 1, wherein the second engine output controlling member begins to move from its first extreme position before the first engine output controlling member moves to its second extreme position.

3. An engine control system as set forth in claim 2, wherein the second engine output controlling member is moved from its first extreme position at the same time the first engine output controlling member is moved from its first extreme position.

4. An engine control system as set forth in claim 1, wherein one of the engine output controlling members comprises a throttle valve in an induction system of the engine.

5. An engine control system as set forth in claim 4, wherein the throttle valve comprises the first engine output controlling member.

6. An engine control system as set forth in claim 5, wherein the second engine output controlling member begins to move from its first extreme position before the first engine output controlling member moves to its second extreme position.

7. An engine control system as set forth in claim 6, wherein the second engine output controlling member is moved from its first extreme position at the same time the first engine output controlling member is moved from its first extreme position.

8. An engine control system as set forth in claim 1, wherein one of the engine output controlling members comprises a fuel control for supplying the fuel to said engine.

9. An engine control system as set forth in claim 8, wherein the fuel control comprises the second engine output controlling member.

10. An engine control system as set forth in claim 9, wherein the second engine output controlling member begins to move from its first extreme position before the first engine output controlling member moves to its second extreme position.

11. An engine control system as set forth in claim 10, wherein the second engine output controlling member is moved from its first extreme position at the same time the first engine output controlling member is moved from its first extreme position.

12. An engine control system as set forth in claim 11, wherein the first engine output controlling member comprises a throttle valve in an induction system of said engine.

13. An engine control system as set forth in claim 1, wherein one of the engine output controlling members comprises a spark advance mechanism for controlling the timing of firing of the spark plugs of the engine.

14. An engine control system as set forth in claim 13, wherein the spark advance mechanism comprises the second engine output controlling member.

15. An engine control system as set forth in claim 14, wherein the second engine output controlling member begins to move from its first extreme position before the first engine output controlling member moves to its second extreme position.

16. An engine control system as set forth in claim 15, wherein the second engine output controlling member is moved from its first extreme position at the same time the first engine output controlling member is moved from its first extreme position.

17. An engine control system as set forth in claim 16, wherein the first engine output controlling member comprises a throttle valve in an induction system of said engine.

18. An engine control system as set forth in claim 1, wherein one of the engine output controlling members comprises an exhaust gas recirculating system for recirculating a portion of the exhaust gases from an exhaust system of the engine back to a combustion chamber of the engine.

19. An engine control system as set forth in claim 18, wherein the exhaust gas recirculation system comprises the second engine output controlling member.

20. An engine control system as set forth in claim 19, wherein the amount of exhaust gases recirculated is increased upon movement of the second engine output controlling member from its first extreme position until the first engine output controlling member is moved to its intermediate position and thereafter the amount of exhaust gases recirculated is decreased as the second engine output controlling member is moved from an intermediate position corresponding to the intermediate position of the first engine output controlling member and to its second extreme position.

21. An engine control system as set forth in claim 20, wherein the first engine output controlling member comprises a throttle valve in an induction system of said engine.

22. An engine control system as set forth in claim 1, wherein the second engine output controlling member comprises means for introducing secondary air to the engine and wherein the engine has an exhaust system including a three way catalyst.

23. An engine control system as set forth in claim 22, wherein the secondary air is the second engine output controlling member.

24. An engine control system as set forth in claim 23, wherein the second engine output controlling member is not moved until the first engine output controlling member is in its intermediate position and then the second engine output controlling member is moved from its first intermediate position at which secondary airflow is begun to its second extreme position in which the amount of secondary air is at the greatest when the operator controlled control member is moved from its intermediate position to its second extreme position.

25. An engine control system as set forth in claim 24, wherein the first engine output controlling member comprises a throttle valve in an induction system of said engine.

* * * * *